United States Patent [19]

Nozue et al.

[11] Patent Number: 4,511,668

[45] Date of Patent: Apr. 16, 1985

[54] CATALYST FOR USE IN HYDROLYSIS OF CARBONYL SULFIDE

[75] Inventors: Ikutoshi Nozue; Susumu Fujii; Masayuki Hanada, all of Kitakyushu, Japan

[73] Assignee: Catalysts & Chemicals Industries Co., Ltd., Tokyo, Japan

[21] Appl. No.: 545,406

[22] Filed: Oct. 25, 1983

[51] Int. Cl.$^3$ .................. B01J 21/06; B01J 23/02; B01J 23/06; B01J 23/14
[52] U.S. Cl. ...................... 502/84; 502/242; 502/341; 502/342; 502/344; 502/351; 423/244
[58] Field of Search ............... 502/242, 341, 342, 344, 502/351, 84; 423/244 A, 244 R

[56] References Cited

U.S. PATENT DOCUMENTS 4,399,112 8/1983 Voirin .................................. 423/244
4,422,958 12/1983 Dupin ............................. 423/244 X

FOREIGN PATENT DOCUMENTS 644249 7/1962 Canada ........................ 423/244 A

*Primary Examiner*—W. J. Shine
*Attorney, Agent, or Firm*—Flynn, Thiel, Boutell & Tanis

[57] ABSTRACT

A catalyst which comprises titanium oxide reinforcing material and oxides of one or more metals selected from Group Ia, Group IIa, Group IIb and Group IVb of the periodic table, the weight of said oxides corresponding to at least 0.5 wt. % of the weight of a final catalyst exhibits an excellent activity in hydrolysis of carbonyl sulfide. Said catalytic activity has no possibility of deterioration even in the presence of hydrogen sulfide and/or carbon dioxide coexist with feed gas.

6 Claims, 3 Drawing Figures

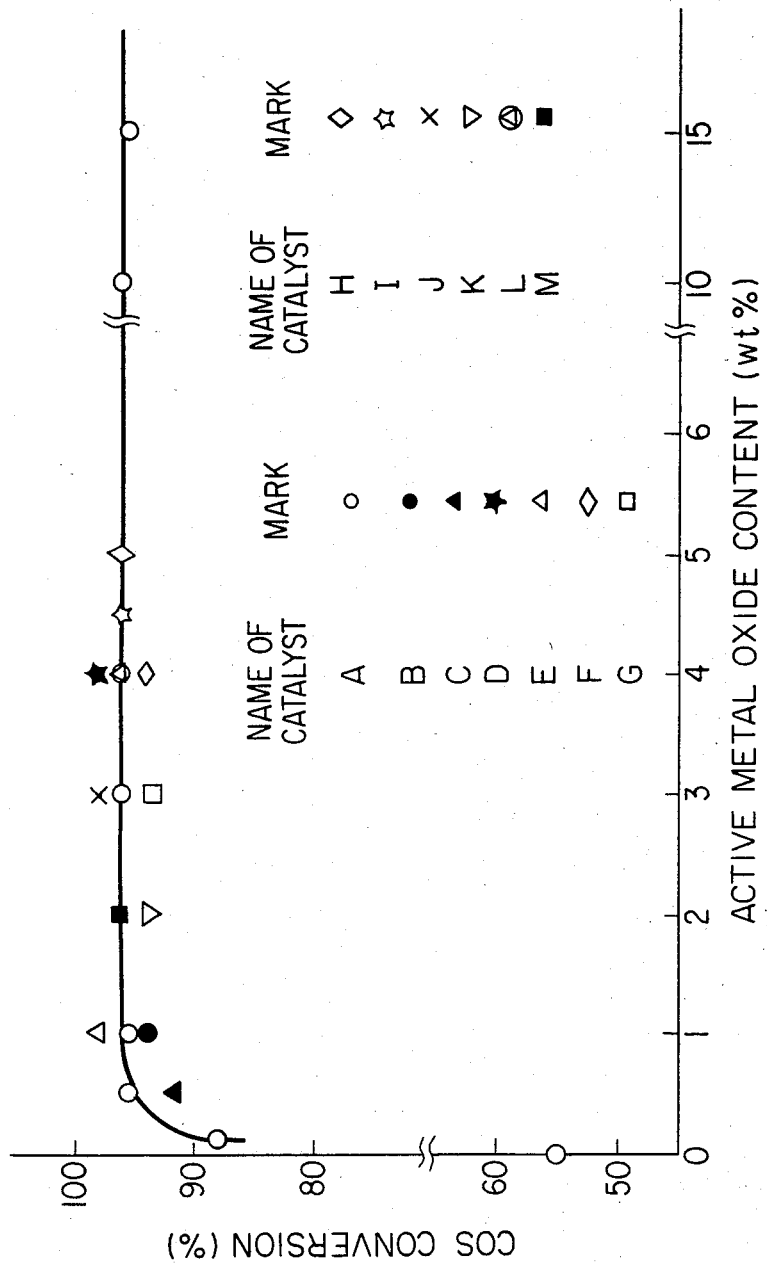

CATALYST FOR USE IN HYDROLYSIS OF CARBONYL SULFIDE

BACKGROUND OF THE INVENTION

The present invention relates to a catalyst suitable for converting the carbonyl sulfide in gas into hydrogen sulfide in the presence of water vapor.

Since the sulfur compounds in various gases poison the catalysts used in various chemical processes or corrode the apparatuses used, vigorous efforts have been made in order to remove such sulfur compounds. Generally, it is necessary to remove sulfur compounds from effluent gases from the viewpoint of air pollution.

Of the sulfur compounds mixed in gases, $H_2S$ and $SO_2$ are relatively easy to remove, and can be removed by dry methods, in addition to wet methods such as alkali solution washing, amine absorption and the like. However, because carbonyl sulfide is difficult to remove by wet methods effectively, it is ordinarily converted into hydrogen sulfide by hydrolysis as below:

$$COS + H_2O \rightarrow H_2S + CO_2$$

The example of converting carbonyl sulfide in gas into hydrogen sulfide in the presence of water vapor can be observed when treating the tail gas of the Claus method. In this case, the catalysts used are usually titanium oxide, as the carrier, and oxides of transition metals such as iron, cobalt, nickel, molybdenum and the like as active ingredients. We have, however, found that the catalysts mentioned above suffer severe deterioration in the presence of hydrogen sulfide. In view of the fact that hydrolysis of carbonyl sulfide is unavoidably accompanied by the creation of hydrogen sulfide, the deterioration in activity may be a fatal defect to the catalysts for use in hydrolysis of carbonyl sulfide.

SUMMARY OF THE INVENTION

The object of the present invention is to provide a catalytic composition for use in hydrolysis of carbonyl sulfide whose activity scarcely deteriorates even in the presence of hydrogen sulfide. This catalyst is prepared by admixing titanium oxide and reinforcing material with oxides of one or more metals selected from the group consisting of an alkali metal such as Li, Na, K, Cs or the like, an alkaline earth metal such as Mg, Ca, Ba or the like, Group IIb metal such as Zn, Cd or the like and Group IVa metal such as Sn, Pb or the like in the amount of at least 0.5 wt.% of the final catalyst weight.

The catalyst comprises mainly titanium oxide and metal oxide(s). The activity of COS-hydrolysis of this catalyst increases with the amount of metal oxide, but remains substantially on the same level to the amount of 0.5 wt.% or more. Further amount of metal oxide shows no marked improvement in the activity of COS-hydrolysis. In view of this, the preferable amount of metal oxide is at least 0.5 wt.% and the upper limit thereof is 10 wt.% from the economical point of view.

BRIEF DESCRIPTION OF THE DRAWINGS

FIG. 2 is a graph showing the activities of hydrolysing carbonyl sulfide of the catalysts according to the present invention. The conversion are plotted against the active metal contents of the catalyst in this figure.

DETAILED DESCRIPTION OF THE INVENTION

The processes for manufacturing the catalysts of the present invention will be explained hereinafter:

(a) The process which comprises mixing a titanic acid or titanate and reinforcing material with salts or oxides of active metal species selected from said alkali metal, alkaline earth metals, Group IIb metal and Group IVa metals, forming this mixture into an optional shape and dimensions and thereafter calcining the same;

(b) The process which comprises impregnating a carrier, made of a titanium oxide and reinforcing material and formed into an optional shape and dimensions, with an active metal species salt solution and thereafter calcining the same; and (c) The process which comprises impregnating titanium oxide powder with an active metal species salt solution, thereafter admixing the same with reinforcing material, forming it into an optional shape and dimensions, and then calcining.

The reinforcing material used herein comprises one or more members selected from silica, alumina, clay and aluminosilicate. To keep the activity of this catalyst high, the amount of reinforcing material used should be limited to 30 wt.% of the moldings at the most.

The catalysts according to the present invention may be manufactured, however, by any other process normally used in the preparation of such formed catalysts.

The hydrolysis of carbonyl sulfide using the catalyst according to the present invention is only carried out at a temperature of 200° C. or more. When a high temperature of 400° C. or more is employed, however, the rate of reaction does not increase so much. Therefore, it is preferable that the catalysts according to the present invention be used at a temperature range of 200° to 400° C.

Figure 1:
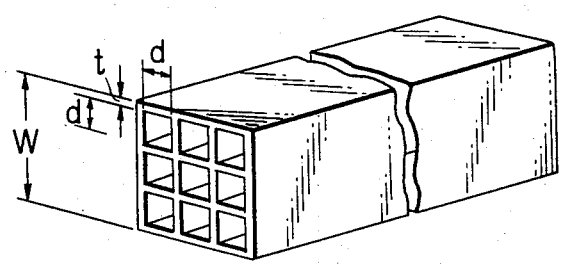
FIG. 1 is a perspective view of a titanium oxide carrier used in Example 2.

The catalysts of the present invention are extremely effective for converting the carbonyl sulfide in gas into hydrogen sulfide by the hydrolysis reaction, and their activity is scarcely deteriorated in the presence of hydrogen sulfide, carbon dioxide and other substances in the reaction system. Therefore, the catalysts of the present invention may be utilized in the treatment of not only the tail gas of the Claus method but also various carbonyl sulfide-containing various exhaust gases, and are also effective for hydrolysis of the carbonyl sulfide contained in the gases with which reducing gases coexist, such as those resulting from coal gasification, petroleum cracking and the like. In view of the fact that the gases obtained by coal gasification normally contain dust in an amount of about several ten-grams/$Nm^3$, it is preferable that when treating these gases, the catalyst has previously been made to take a shape capable of preventing the catalyst from abrasion and the catalyst bed from logging, for instance, a honeycomb shape or a shape as shown in FIG. 1.

EXAMPLE 1

A 5 mm$\phi$ spherical titanium oxide carrier ($TiO_2$ 93 wt.%, $SiO_2$ 4 wt.% and $Al_2O_3$ 3 wt.%) was placed in a vessel equipped with a vacuum system and an impregnating liquid supply system, and decompressed for 20 minutes through said vacuum system. Next, a predetermined amount of impregnating liquid was sprayed on the titanium oxide carrier through said impregnating liquid supply system and was left standing for one night. Thereafter, the carrier was taken out therefrom, dried in a rotary dryer at 120° C. for 1 hour, and thereafter calcined at 500° C. for 3 hours. Thus, there were obtained catalysts as shown in Table 1.

TABLE 1

| Name of Catalyst | Active metal species | Active metal contents (as oxide) wt. % | Remarks* |
|---|---|---|---|
| A-1 | Ba | 0.1 | barium acetate |
| 2 | Ba | 0.5 | barium acetate |
| 3 | Ba | 1 | barium acetate |
| 4 | Ba | 4 | barium acetate |
| 5 | Ba | 10 | barium acetate |
| 6 | Ba | 15 | barium acetate |
| G | Ca | 1 | calcium acetate |
| F | Mg | 0.5 | magnesium nitrate |
| H | Zn | 4 | zinc acetate |
| I | Cd | 1 | |
| B | Li | 4 | lithium hydroxide |
| C | Na | 3 | sodium hydroxide |
| K | Ba/Zn | 2.5/2.5 | barium acetate/zinc acetate |
| L | Ba/Pb | 2.5/2 | barium acetate/lead acetate |
| M | Zn/Pb | 1.5/1.5 | zinc acetate/lead acetate |
| D | K | 3 | potassium hydroxide |
| E | Cs | 4 | cesium nitrate |
| J | Sn | 2 | tin nitrate |

*denotes precursor of active metal species

EXAMPLE 2

A titanium oxide lattice-shaped carrier (monolith: $TiO_2$ 95 wt.%, $SiO_2$ 3 wt.% and $Al_2O_3$ 2 wt.%) as shown in FIG. 1 (wherein, d=8.4 mm, t=1.4 mm and W=30.8 mm) was dipped into an aqueous solution obtained by dissolving a predetermined amount of a precursor compound of an active metal species in 400 cc of distilled water, and was left standing at room temperature (17° C.) for 1 hour. Thereafter, the carrier was taken out of the aqueous solution, and was dried for 12 hours while passing air through the lattice opening of the carrier. This carrier was then calcined at 500° C. for 3 hours. Thus, there was obtained a catalyst as shown in Table II.

TABLE II

| Name of catalyst | Active metal species | Contents (as oxide) wt. % |
|---|---|---|
| N | Mg | 1 |
| O | Ca | 1 |
| P | Ba | 1 |
| Q | Zn | 1 |
| R | Pb | 1 |
| S | Ba/Zn | 1/1 |
| T | Ba | 4 |

EXPERIMENT 1

A glass-made reactor (50 mm inside diameter and 400 mm length) was charged with a predetermined amount of Catalyst A-1, and the gas having a composition (COS 73 ppm, $H_2S$ 800 ppm, $H_2O$ 3%, $N_2$ 96.9%) was passed through the same. The initial COS hydrolysis activity of Catalyst A-1 was measured under the conditions of SV 7000 $hr^{-1}$ and reaction temperature 350° C.

Following the same procedure, the titanium oxide carrier used in Example 1 and Catalysts A-2 to M were evaluated with reference to the initial COS hydrolysis activity, and the thus obtained results are as shown in FIG. 2.

EXPERIMENT 2

The reactor used in Experiment 1 was charged with a catalyst after the gaps between the inner wall of said reactor and the outside of a lattice-shaped catalyst had been filled up with ceramic fiber and sea sand. This catalyst was evaluated with reference to the COS hydrolysis activity at a reaction temperature of 400° C. in accordance with the same procedure as Experiment 1. Catalysts N to S were subjected to this evaluation procedure. The obtained results are as shown in Table III.

TABLE III

| Name of catalyst | Shape | Active metal species | COS conversion rate (%) |
|---|---|---|---|
| N | lattice-shaped | Mg (1) | 71.1 |
| O | lattice-shaped | Ca (1) | 78.3 |
| P | lattice-shaped | Ba (1) | 82.0 |
| Q | lattice-shaped | Zn (1) | 88.5 |
| R | lattice-shaped | Pb (1) | 82.8 |
| S | lattice-shaped | Ba/Zn (1/1) | 90.2 |

Note
The numbers in round brackets denote the amounts of active metal species contained (wt. % as oxide)

EXPERIMENT 3

For examining the effect of the components admixed with the COS-containing gas on the COS hydrolysis, Catalyst T which comprise admixing a lattice-shaped titanium oxide carrier with 4 wt.% of barium as oxide was placed in a reactor as in Example 2 and subjected to the same test procedure as Experiment 1 at a reaction temperature of 400° C. The obtained results are as shown in Table IV.

TABLE IV

| Experiment No. | Gas composition | | | | | | | | | SV ($hr^{-1}$) | COS conversion rate (%) |
| | COS ppm | $H_2S$ ppm | $NH_3$ ppm | HCl ppm | $H_2O$ % | $H_2$ % | CO % | $CO_2$ % | $N_2$ % | | |
|---|---|---|---|---|---|---|---|---|---|---|---|
| 1 | 73 | — | — | — | 3 | — | — | — | 96.9 | 7000 | 82 |
| 2 | 73 | 800 | — | — | 3 | — | — | — | 96.9 | 7000 | 81 |
| 3 | 73 | 800 | — | — | 3 | — | — | 3 | 93.9 | 7000 | 79 |
| 4 | 73 | — | — | — | 3 | 10 | 25 | — | 62.0 | 7000 | 84 |
| 5 | 73 | 800 | — | — | 3 | 10 | 25 | 3 | 58.9 | 7000 | 79 |
| 6 | 73 | 800 | — | — | 3 | 10 | 25 | 3 | 59 | 12900 | 59.0 |
| 7 | 73 | 800 | — | 100 | 3 | 10 | 25 | 3 | 59 | 12900 | 59.0 |

TABLE IV-continued

| Experiment No. | Gas composition | | | | | | | | | SV (hr$^{-1}$) | COS conversion rate (%) |
|---|---|---|---|---|---|---|---|---|---|---|---|
| | COS ppm | H$_2$S ppm | NH$_3$ ppm | HCl ppm | H$_2$O % | H$_2$ % | CO % | CO$_2$ % | N$_2$ % | | |
| 8 | 73 | 800 | 2000 | 100 | 3 | 10 | 25 | 3 | 58.8 | 12900 | 59.0 |

From comparison of Experiments Nos. 1 to 3 of Table IV, the activity of the catalyst of the present invention is shown barely influenced by the presence of hydrogen sulfide and carbon dioxide. Likewise, from Experiment Nos. 4 and 5, it is found that the catalyst of the present invention can exhibit a superior activity even when reducing gases (CO and H$_2$) and CO$_2$ coexist. In this connection, it is to be noted that the raw gas used in Experiment No. 5 is of substantially the same composition as the gas obtained by the gasification of coal. The latter gas sometimes contains HCl, NH$_3$ and the like, but as is evident from comparison of Experiment Nos. 6 to 8, the catalyst of the present invention is entirely free from the influence of HCl and NH$_3$.

EXPERIMENT 4

Catalysts enumerated in Table V were obtained by repeating exactly the same procedure as Example 1

TABLE V

| Name of catalyst | Active metal species | Content (as oxide) wt. % |
|---|---|---|
| A-4 | Ba | 4 |
| B | Li | 4 |
| H | Zn | 4 |
| Y | Ni | 4 |
| Z | Co/Mo | 4/4 |

Figure 3:
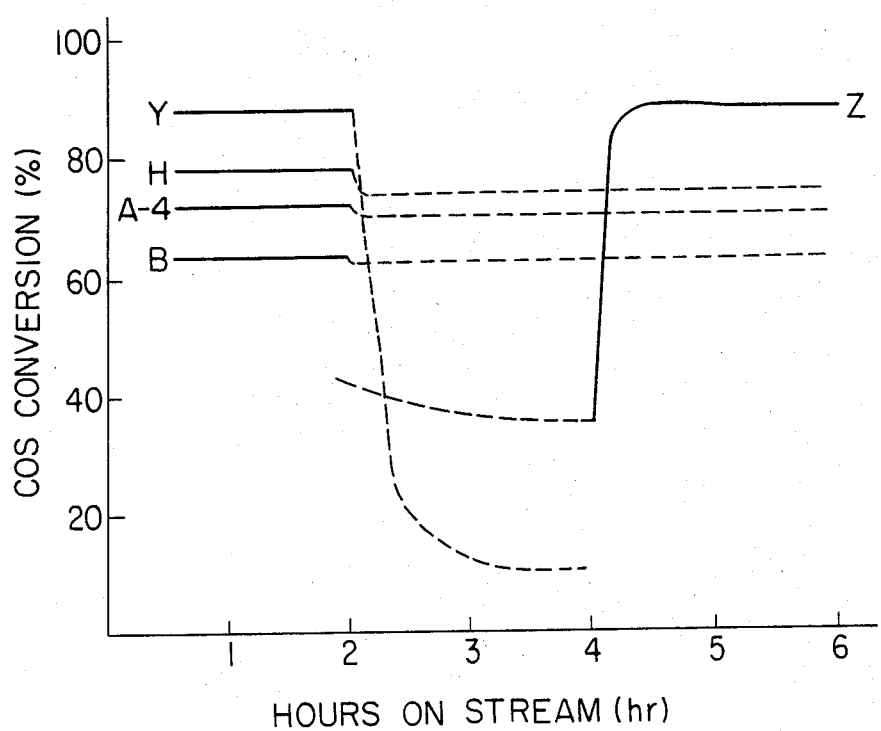
FIG. 3 is a graph which compares the activities of hydrolysing carbonyl sulfide of the catalysts according to the present invention and of the conventional ones. The conversion are plotted against hours on stream.

There catalysts were placed respectively in the same reactor as Example 1 and fed with the undermentioned gas of Composition [I] for hydrolysis under the conditions of reaction temperature 400° C. and SV 12900 hr$^{-1}$. After 2 hours, the gas fed to the reactor was changed to the one undermentioned [II] for followup study of the changes in COS conversion with reaction time. The obtained results are shown in FIG. 3. In FIG. 3, it is to be noted that only the case of Catalyst Z, the supply of gases was reversed, namely, the gas of Composition (II) was first supplied, and then the gas of Composition (I) was.

TABLE VI

| Gas composition | [I] | [II] |
|---|---|---|
| COS | 73 ppm | 73 ppm |
| H$_2$S | — | 800 ppm |
| H$_2$O | 3% | 3% |
| N$_2$ | 96.9% | 96.9% |

As shown in FIG. 3, the conversion of the catalysts of the present invention, A-4, B and H, lowered only about 1 to 5% even when the gas is admixed with H$_2$S. In contrast, Control Catalysts Y and Z are influenced markedly by the presence of H$_2$S, showing 50 to 80% down of its activity.

What is claimed is:

1. A catalyst composition for use in the hydrolysis of carbonyl sulfide to convert same into hydrogen sulfide, which consists essentially of a catalyst carrier made of titanium oxide and not more than 30 wt.% of a reinforcing material selected from the group consisting of silica, alumina, clay and aluminosilicate, said catalyst carrier having deposited thereon from 0.5 to about 10 wt.% of at least one oxide of a metal of Group IA or Group IIA of the Periodic Chart of the Elements.

2. A catalyst according to claim 1 wherein said metal is lithium, sodium, potassium or cesium.

3. A catalyst according to claim 1 wherein said metal is magnesium, calcium or barium.

4. A catalyst according to claim 1 in which said oxide is lithium or sodium oxide.

5. A catalyst composition for use in the hydrolysis of carbonyl sulfide to convert same into hydrogen sulfide, which consists essentially of a catalyst carrier made of titanium oxide and not more than 30 wt.% of a reinforcing material selected from the group consisting of silica, alumina, clay and aluminosilicate, said catalyst carrier having deposited thereon from 0.5 to 10 wt.% of a mixture of oxides of two metals selected from the group consisting of (1) barium and zinc, (2) barium and lead and (3) zinc and lead.

6. A catalyst according to claim 5 in which said mixture of oxides consists of a mixture of oxides of barium and zinc.

* * * * *